United States Patent [19]
Shigehara

[11] 3,765,621
[45] Oct. 16, 1973

[54] SYSTEM OF CONTROLLING THE ATTITUDE OF A SPINNING SATELLITE IN EARTH ORBITS

[75] Inventor: Masamichi Shigehara, Yokohama, Japan

[73] Assignee: Tokyo Shibaura Electric Co., Ltd., Kawasaki-shi, Japan

[22] Filed: July 26, 1971

[21] Appl. No.: 164,864

[30] Foreign Application Priority Data
July 29, 1970 Japan............................. 45/65689

[52] U.S. Cl............ 244/1 SA, 235/150.2, 244/3.21, 244/77 SS
[51] Int. Cl................................................. B64g 1/10
[58] Field of Search ................ 244/1 SA, 1 SS, 3.2, 244/3.21, 3.22, 77 SS; 235/150.2, 197

[56] References Cited
UNITED STATES PATENTS

| 3,681,583 | 8/1972 | Kubo et al. ................. 244/1 SA X |
| 3,061,239 | 10/1962 | Rusk ............................ 244/1 SA |
| 3,232,561 | 2/1966 | Adams ......................... 244/1 SA |
| 3,359,407 | 12/1967 | Paige ........................... 244/1 SA |
| 3,430,855 | 3/1969 | Hartwell et al. ............. 235/197 |
| 3,443,082 | 5/1969 | Abe .............................. 235/197 |
| 3,525,861 | 8/1970 | Alexander .................... 235/197 |
| 3,545,703 | 12/1970 | Doniger et al. ................ 244/77 |
| 3,573,451 | 4/1971 | Fricke et al. ................. 235/197 |
| 3,603,777 | 9/1971 | Kihlberg ...................... 235/197 |
| 3,621,228 | 11/1971 | Paine ........................... 235/197 |
| 3,486,018 | 12/1969 | Warren......................... 235/197 |

Primary Examiner—Milton Buchler
Assistant Examiner—Barry L. Kelmachter
Attorney—R. D. Flynn et al.

[57] ABSTRACT

A system of controlling the attitude of a spinning satellite by controlling a satellite-borne magnetic control element according to a switching function S defined by $$S = \vec{E} \cdot (\vec{k_B} \times \vec{B})$$

where $\vec{E} = \vec{H} - \vec{Hf}$
($\vec{H}$; instantaneous attitude of a spinning satellite; $\vec{Hf}$; desired attitude of the spinning satellite)
$\vec{k_B}$; spin axis of the spinning satellite
$\vec{B}$; earth's magnetic field at the instantaneous position of the spinning satellite
wherein said magnetic control element is controlled by a pattern weighted near the middle between the two adjoining switching points of the switching function S.

5 Claims, 11 Drawing Figures

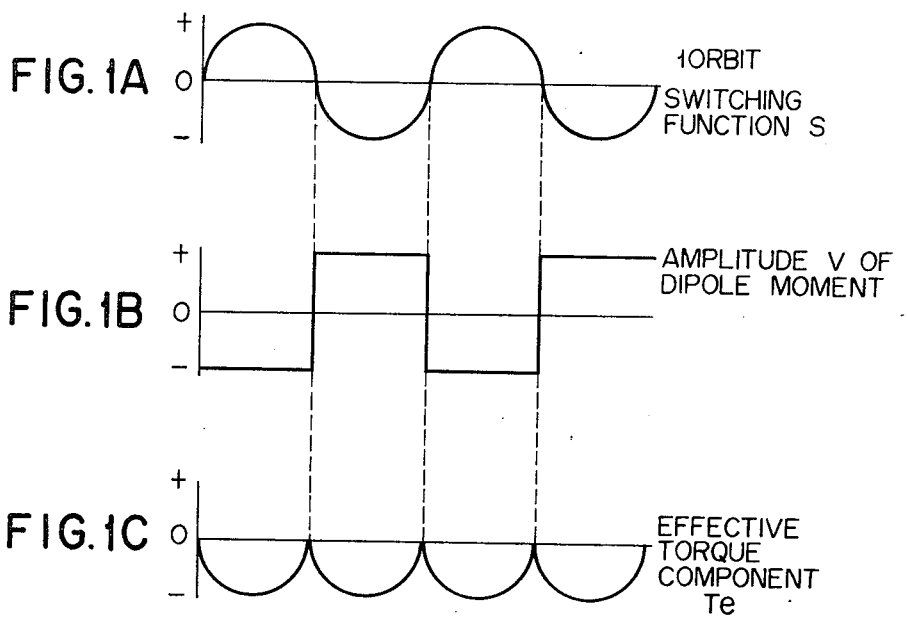
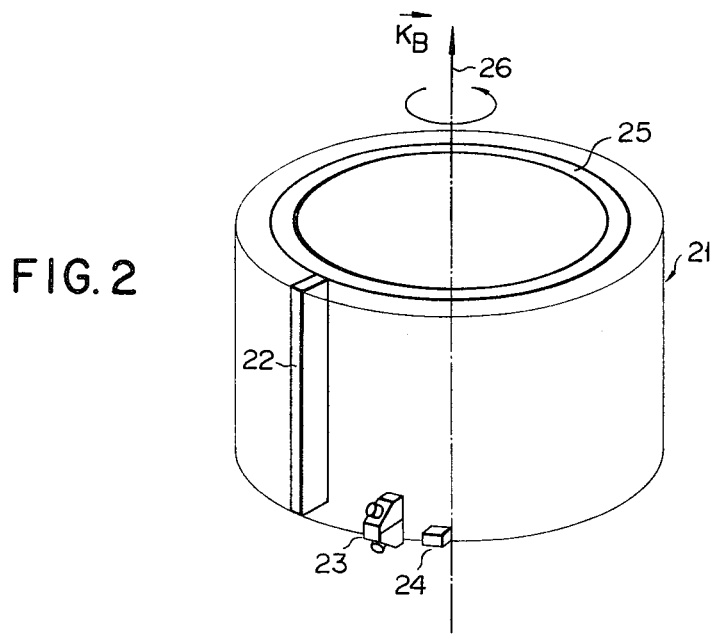

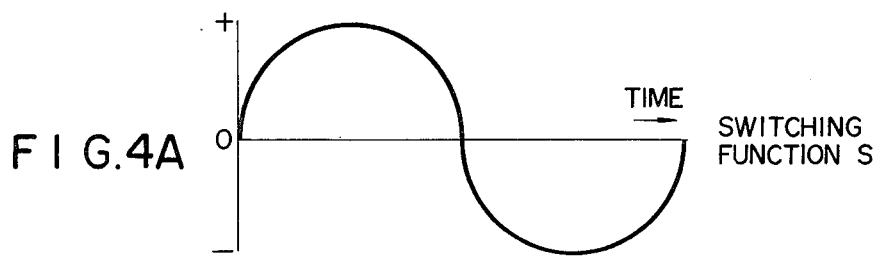
FIG.4A — SWITCHING FUNCTION S
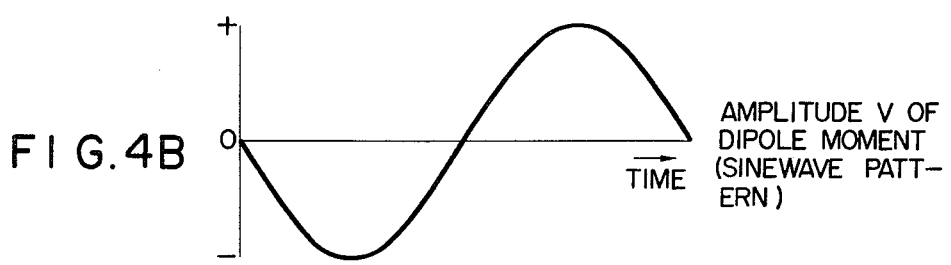
FIG.4B — AMPLITUDE V OF DIPOLE MOMENT (SINEWAVE PATTERN)
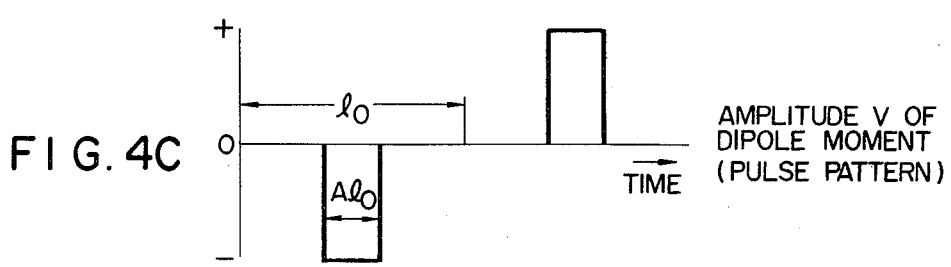
FIG.4C — AMPLITUDE V OF DIPOLE MOMENT (PULSE PATTERN)
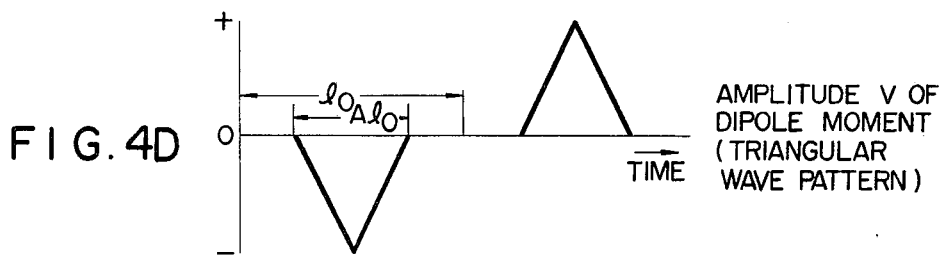
FIG.4D — AMPLITUDE V OF DIPOLE MOMENT (TRIANGULAR WAVE PATTERN)
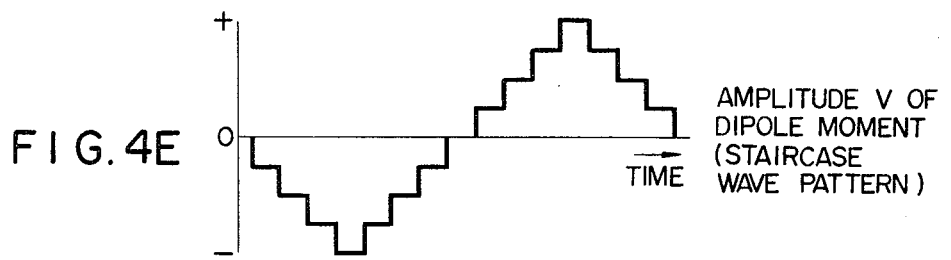
FIG.4E — AMPLITUDE V OF DIPOLE MOMENT (STAIRCASE WAVE PATTERN)

SYSTEM OF CONTROLLING THE ATTITUDE OF A SPINNING SATELLITE IN EARTH ORBITS

This invention relates to a system of controlling the attitude of a spinning satellite and more particularly to an attitude control system of utilizing the torque generated by interaction between earth's magnetic field and the satellite borne magnetic control element.

The conventional attitude control system using the torque produced by interaction between earth's magnetic field and satallite-borne magnetic control element is already known, for example, by the "Pre-print form Proceedings of AIAA / JACC Guidance and Control Conference, Aug. 15, 1968." If vector $\vec{M}$ designates the magnetic dipole moment of a satellite-borne magnetic control element and vector $\vec{B}$ earth's magnetic field near the spinning satellite, then the torque, vector $\vec{T}$, generated by interaction between them is given by $$\vec{T} = \vec{M} \times \vec{B} \quad \quad 1$$

where
 $\vec{M}$; dipole moment
 $\vec{B}$; earth's magnetic field at instantaneous position of spinning satellite.

The magnetic control element is mounted on the spinning satellite in such a manner that it can produce the dipole moment $\vec{M}$ in the direction parallel to the spin axis of the spinning satellite. The dipole moment $\vec{M}$ may be expressed as $$\vec{M} = V\vec{k}_B \quad \quad 2$$

where
 $\vec{k}_B$; unit vector in direction of satellite's spin axis
 $V$; amplitude of dipole moment to be controlled by the equations given below.

The error angular momentum $\vec{E}$ to be controlled is first given by $$\vec{E} = \vec{H} - \vec{H}f \quad \quad 3$$

in which
 $\vec{H}$; instantaneous angular momentum of spinning satellite's spin axis
 $\vec{H}f$; desired angular momentum
since $\vec{H}f$ is constant in Eq. (3), this kinematic equation may be expressed as $$\vec{T} = d\vec{H}/dt = d\vec{E}/dt \quad \quad 4$$

from Eqs. (1), (2) and (4)

$$d\vec{E}/dt = V (\vec{k}_B \times \vec{B}) \quad \quad 5$$

making scalar product of $\vec{E}$ on both sides of Eq. (5), we have $$\tfrac{1}{2}\, dE^2/dt = V\vec{E} \cdot (\vec{k}_B \times \vec{B}) \quad \quad 6$$

Since the right side of Eq. (6) has only to be minus to obtain the asymptotic stability condition, if a switching function S being defined by $$S = \vec{E} \cdot (\vec{k}_B \times \vec{B}) \quad \quad 7$$

the amplitude V of the dipole moment should be given as follows:

$$V = -\beta^2 \, \text{sgn}\, S \quad \quad 8$$

where $\beta^2$ represents absolute value of amplitude of the dipole moment.

The switching function S defined by Eq. (7) in a typical case where the desired spin axis is out of the satellite's orbital plane is, for example, as shown in FIG. 1A with respect to one orbital period. Therefore, V defined by Eq. (8) is switched as indicated in FIG. 1B. Note that the attitude control system of controlling the dipole moment by using the switching function S has already been disclosed by the present inventor in U.S. Pat. No. 3,681,583, issued on Aug. 1, 1972.

From Eqs. (4) and (5) the torque $\vec{T}$ may be expressed as $$\vec{T} = V (\vec{k}_B \times \vec{B}) \quad \quad 9$$

The effective torque component Te to reduce the error $\vec{E}$ is given as the component of $\vec{T}$ in the $\vec{E}$ direction. Thus, $$Te = \vec{E}/E \times \vec{T} = V/E \times S \quad \quad 10$$

where
 $E = |\vec{E}|$

It is clear from Eq. (10) that the magnitude of the effective torque component Te corresponds to the switching function S. For example, the effective torque component in the case as shown in FIGS. 1A and 1B becomes as indicated in FIG. 1C. When the dipole moment $\vec{M}$ is switched according to a square wave pattern, the effective torque component Te varies with the switching function S, the maximum value being near the middle between the two adjoining polarity switching points of the S and the minimum at the polarity switching points. As a result, the dipole moment produced in the magnetic control element does not effectively operate near the polarity switching points. Therefore, its control efficiency is anything but good.

Accordingly, an object of this invention is to provide an attitude control system of the type of efficiently controlling the dipole moment by using the switching function S.

The attitude control system of this system can reduce the loss by decreasing the value of dipole moment near the polarity switching points of the switching function S and increasing it substantially in the middle between the two adjoining polarity switching points, thereby improving its control efficiency.

The present invention can be more fully understood from the following detailed description when taken in conjunction with the appended drawings, in which:

FIG. 1A is a graph showing a typical switching function S in one orbit of a spinning satellite;

FIG. 1B is a graph indicating the control pattern of the amplitude V of a dipole moment $\vec{M}$ in the conventional attitude control system;

FIG. 1C is a graph representing the effective torque component $\vec{Te}$ of a dipole moment $\vec{M}$ where the amplitude V of the dipole moment is controlled according to the pattern shown in FIG. 1B;

FIG. 2 is a schematic diagram of the artificial satellite mounting part of the control system according to an embodiment of the invention;

FIG. 4A is a graph denoting the switching function S;

Figure 3:
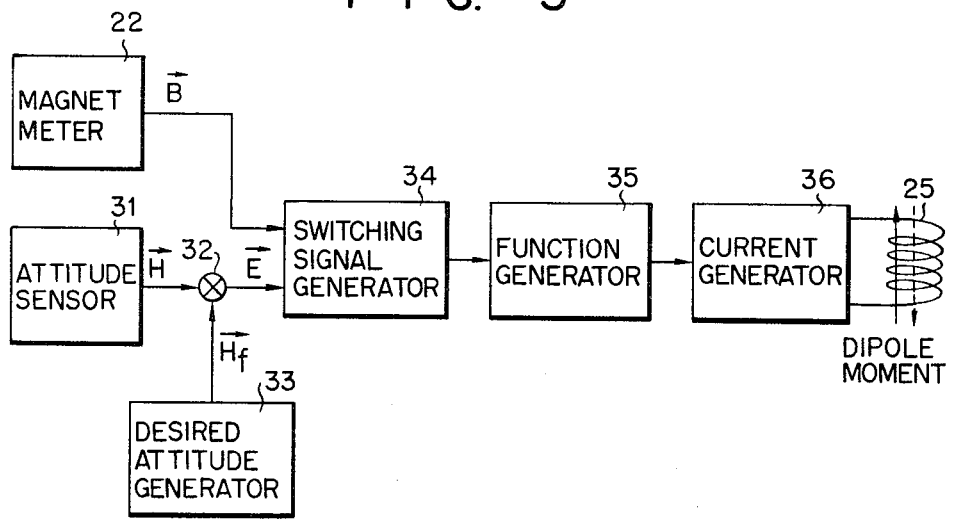
FIG. 3 is a block diagram showing the attitude control system according to an embodiment of the invention.
Figure 5:
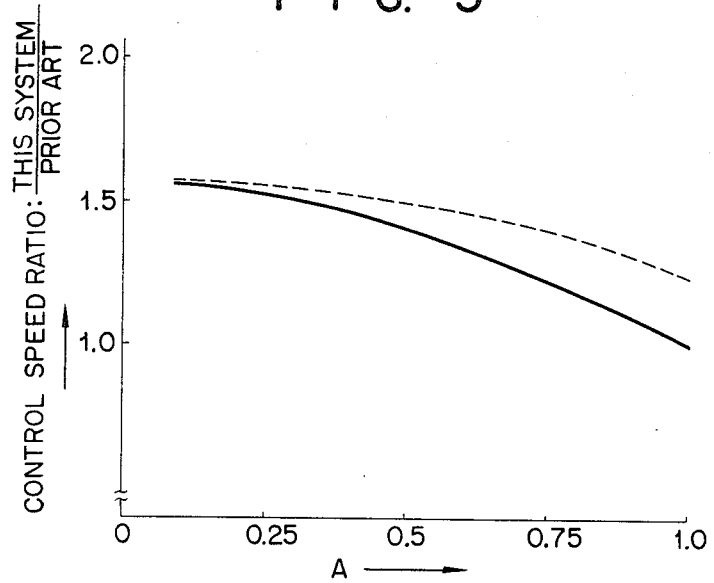

FIGS. 4B to 4E respectively are graphs illustrating four different control patterns of the dipole moment in the embodiment of FIG. 3; and FIG. 5 is a graph explaining the advantages of this embodiment.

In FIG. 2 is shown a spinning satellite 21 having a spin axis 26 and mounting a magnet meter 22 for detecting earth's magnetic field near the spinning satellite, a V-head horizon sensor 23 and a solar-aspect sensor 24 for detecting the instantaneous attitude of the spinning satellite, and also a coil 25. The coil 25 is mounted on the plane perpendicular to the spin axis 26 so as to generate the dipole moment $\vec{M}$ in the direction parallel to the spin axis $\vec{k}_B$. Since these control system components are all known in this field of industry, a detailed description of their respective operations and constructions is omitted here.

The entire attitude control system of an embodiment according to this invention is shown in FIG. 3. The signal designating earth's magnetic field $\vec{B}$ near the spinning satellite is generated by the magnet meter 22 and transmitted to a switching signal generator 34. In this embodiment, the signal denoting the angular momentum $\vec{H}$ of the spin axis $\vec{k}_B$ of the spinning satellite is generated by an attitude sensor 31 consisting of the V-head horizon sensor 23 and the solar-aspect sensor 24 shown in FIG. 2 and is delivered to a comparator 32 so as to be compared with the signal indicating the desired angular momentum $\vec{Hf}$ to be supplied from a desired attitude generator 33 as an input means of the desired attitude signal. The resultant error $\vec{E}$ ($\vec{E} = \vec{H} - \vec{Hf}$), see also Eq. (3)) signal is fed to a switching signal generator 34. Since the comparator 32 and desired attitude generator 33 are usually installed on the ground and are all known in this field of industry, the detailed descriptions thereof are omitted here. The switching signal generator 34 is ordinarily established on the ground. It comprises a common computer comprised of an arithmetic unit for performing arithmetical and logical operations corresponding to the aforementioned Eqs. (4), (5), (6) and (7) in accordance with the input signal representing the aforesaid $\vec{B}$ and $\vec{E}$ to induce the switching function S and a signal generating means to generate a switching signal according to the polarity switching of the switching function S. The switching signal from the output of the switching signal generator 34 is delivered to a function generator 35 to enable the function generator to generate a control signal according to this switching signal. This control signal has a pattern such as sine wave, pulse, triangular wave, staircase wave, or the like. Note that the detailed description of the function generator 35 is omitted here partly because it is usually used for an automatic control system in other fields of industry and partly because the known type of generating the control signal of the aforesaid pattern is applicable. The control signal generated by the function generator 35 directs a current generator 36 to control the dipole moment produced in the coil 25 mounted on the satellite 21. Therefore, the control signal from the function generator 35 regulates the amplitude V of the dipole moment $\vec{M}$ by either of the patterns shown in FIGS. 4B to 4E.

Thus, the relations shown in FIGS. 4A to 4E clearly show that, in either pattern of this embodiment, the amplitude of the dipole moment is zero or small near the polarity switching points of the switching function S and is maximum near the middle between the two adjoining polarity switching points. According to this invention, therefore, the dipole moment mostly acts as an efficient torque component and thus is very efficient. The attitude control system of this invention has another advantage in the greater control velocity in comparison with the conventional system of employing the square wave pattern (see FIG. 1B). When the sine wave pattern (FIG. 4B) is used, a control velocity approximately 1.2 times that of the conventional pattern can be obtained. When either the pulse pattern (FIG. 4C) or the triangular wave pattern (FIG. 4B) is employed, there is the improvement of the control velocity, as shown by the solid and dashed lines in FIG. 5. The solid line in FIG. 5 shows a ratio of the control velocity in the system of the present invention to that of the prior art in the values 0 to 1.0 of A as abscissas, where $l_0$ designates the time intervals between the two adjoining polarity switching points of the switching function S and $Al_0$ designates the pulse width in the pulse pattern indicated in FIG. 4C. In the case of the pulse pattern shown in FIG. 4C, the value A is defined to be less than 1.0. The dashed line in FIG. 5 denotes a ratio of the control velocity in the system of the present invention to that of the prior art in the values 0 – 1.0 of A as abscissas, where $l_0$ denotes the time intervals between the two adjacent polarity switching points of the switching function S and $Al_0$ denotes the base width of the triangular wave as shown in FIG. 4D. It is evident from these figures that the attitude control system of this invention has a control velocity about 1.5 times that of the prior art in any case where the value of A as abscissa is suitably fixed.

This embodiment includes the function generator 35 consisting of means for generating a signal having the aforementioned sine wave, pulse, triangular wave, or staircase wave pattern. A function generator comprising means for generating a signal of any other pattern weighted near the middle between the two neighboring polarity switching points of the switching function S may also be used instead.

What is claimed is:

1. A system of controlling the attitude of a spinning satellite comprising:
    a. means for detecting the instantaneous attitude $\vec{H}$ of said satellite in flight;
    b. means for detecting earth's magnetic field $\vec{B}$ near the orbital position of said satellite;
    c. input means of the desired attitude $\vec{Hf}$;
    d. means coupled to said two detecting means and to said input means for inducing a switching function S by performing the following operations:

$$\vec{E} = \vec{H} - \vec{Hf}$$
$$S = \vec{E} \cdot (\vec{k}_B \times \vec{B})$$

where $\vec{k}_B$; unit vector of satellite's spin axis e. means coupled to said means for inducing a switching function S for generating a control signal according to said switching function S, said generating means including weighting means for weighting said control signal so that it has a pattern weighted substantially at the middle between the two adjoining polarity switching points of said switching function S;
f. means coupled to said means for generating a control signal for producing a control current according to said weighted control signal; and
g. a magnetic control element coupled to said means for producing a control current for generating a dipole moment by said control current and mounted to said satellite in such a manner that the direction of said dipole moment is parallel to satellite's spin axis $\vec{k}_B$.

2. The system for controlling the attitude of a spinning satellite according to claim 1, wherein the control signal having a pattern weighted substantially at the middle between the two adjoining polarity switching points of said switching function S has a sine wave pattern.

3. The system for controlling the attitude of a spinning satellite according to claim 1, wherein the control signal having a pattern weighted substantially at the middle between the two adjacent polarity switching points of said switching function S has a pulse pattern.

4. The system for controlling the attitude of a spinning satellite according to claim 1, wherein the control signal having a pattern weighted substantially at the middle between the two neighboring polarity switching points of said switching function S has a triangular wave pattern.

5. The system for controlling the attitude of a spinning satellite according to claim 1, wherein the control signal having a pattern weighted substantially at the middle between the two adjacent polarity switching points of said switching function S has a staircase wave pattern.

* * * * *